ered porous by the process
2,891,016

PROCESS FOR THE MANUFACTURE OF FINELY POROUS BUTADIENE-STYRENE COPOLYMERS

Rudolf Kern, Neustadt, and Wilhelm N. Grohs, Heidelberg, Germany, assignors to Rhein-Chemie G.m.b.H., Mannheim-Rheinau, Germany No Drawing. Application August 24, 1956
Serial No. 605,932

Claims priority, application Germany August 26, 1955

4 Claims. (Cl. 260—2.5)

This invention relates to processes of the kind in which finely porous organic materials of macromolecular structure, such as those of rubber or artificial resins, are produced by means of blowing agents. The blowing agents have the function of blowing up and imparting a porous structure to the material by splitting off gas. The gas is split off during a heat treatment to which the rubber or artificial resin is subjected. The blowing up of the mass causes small gas bubbles to become embedded in its structure, and results in decreasing the specific gravity and heat conductivity of the material. The porous structure of the material is fixed by vulcanisation or a gelatinising process.

This method of rendering rubber or artificial resins porous is used, more especially, for making products of low specific gravity and low heat conductivity such, for example, as the soles of shoes, mats, cushions, etc. However, the process is also applicable when porosity as such is required or for the purpose of absorption in chemical industry.

In the process of the present invention there are used gas-evolving blowing agents, other than nitrosamines, for example, sodium bicarbonate, ammonium bicarbonate, ammonium carbonate, benzene sulphonic acid hydrazide, diazo-aminobenzene, urea, azo-butyric acid nitrile or mixtures of ammonium compounds with alkali nitrites. These substances are incorporated in the rubber or artificial resins in a proportion such that during the usual heat treatment a more or less strongly porous structure is produced.

The present invention is based on the observation that the action of these gas-evolving blowing agents can be improved by using them in conjunction with surface-active substances which reduce the surface tension. The surface-active substance may be mixed with the material which is to be rendered porous, so that the former is brought into contact with the blowing agent only when the latter is mixed with the material to be rendered porous. Alternatively, the surface-active substance may first be mixed with the blowing agent, advantageously by means of apparatus such as a roller mill, colour mill, colloid mill or the like, so that a homogeneous mixture is obtained. In some cases it is of advantage to form the blowing agent in the presence of the surface-active substance, so that the blowing agent is obtained in a very finely divided form.

By the addition of the surface-active substance the action of the blowing agent is unexpectedly improved in several ways. The gas pores in the finished product are more uniformly distributed and are finer, and the product has a lower specific gravity and a lower heat conductivity.

Any surface-active substance capable of reducing the surface tension may be used in the process of the invention, such as alkyl-aryl sulphonates, for example, sodium dodecyl-benzene sulphonate; sulphated fatty alcohols, for example, the sodium salt of a sulphated mixture of fatty alcohols containing 10–16 carbon atoms; or quaternary ammonium salts containing a radical of high molecular weight, for example, oleyl-benzyl-dimethyl-ammonium chloride. Especially suitable are polyalkylene glycol ether derivatives, for example, a reaction product of ethylene oxide with a fatty alcohol.

As substances to be rendered porous by the process of the invention there may be mentioned natural or synthetic rubber and rubber-like artificial resins, for example, polymerization products such as copolymers of butadiene and styrene.

The following examples illustrate the invention. In these examples, which describe rubber or artificial resin mixes, two comparative tests A and B are carried out, tests A being carried out with a blowing agent alone, and tests B with a blowing agent and also a substance reducing the surface tension. In all cases the vulcanisates obtained in tests B have their pores more finely and more uniformly distributed than in the case of the vulcanisates obtained in tests A. This applies also to those examples in which this result is not specifically mentioned. Furthermore, in tests B the volume of the body removed from the mould was greater than that in the case of tests A. The increases in volume coupled with the lowering of the specific gravities of vulcanisates B were measured as compared with those of vulcanisates A and are given below in each test.

Example 1

A rubber mix was prepared having the composition:

| | |
|---|---|
| Pale crepe rubber | 50 |
| Copolymer of butadiene and styrene | 50 |
| Thio-$\beta$-naphthol | 0.4 |
| Calcium silicate | 60 |
| Kaolin | 30 |
| Paraffin wax | 1 |
| Stearic acid | 4 |
| White petroleum jelly | 5 |
| Zinc oxide | 4 |
| Mixture of dibenzthiazyl disulphide and diphenyl-guanidine | 1.5 |
| Sulphur | 2.5 |
| | 208.4 |

The crepe rubber, copolymer of butadiene and styrene and the thio-$\beta$-naphthol were first premasticated for 10 minutes on rollers heated at 100° C., and then the filling material, plasticiser, zinc oxide and finally the accelerator and sulphur were incorporated in the mixture at 50–60° C.

The final mixture was divided into two parts.

(A) 100 grams of the above mixture were mixed with 8 grams of sodium bicarbonate.

(B) 100 grams of the same rubber mix were mixed with 13 grams of a mixture of 8 grams of sodium bicarbonate and 5 grams of a paste of 60 percent strength of sodium dodecyl-benzene sulphonate.

The latter mixture was prepared as follows:

200 grams of sodium carbonate were dissolved in 1000 grams of water, and 10 grams of sodium dodecyl-benzene sulphonate were added. A strong current of carbon dioxide was passed through the mixture for about 5 hours, whereby sodium bicarbonate was precipitated in a very finely divided form. The sodium bicarbonate was filtered off with suction, cautiously dried, and then weighed about 150 grams. 8 grams of the resulting mixture were intimately triturated on a roller mill with 5 grams of a paste of 60 percent strength of sodium dodecyl-benzene sulphonate. The mixture was then added to the rubber mix.

Test portions of the above compositions (A) and (B) were heated under exactly the same conditions in a vulcanising press in closed moulds for 20 minutes at 141° C. The vulcanisate produced with composition (B) had a considerably larger volume and also finer and more uniform pores than those of the vulcanisate made from composition (A). Vulcanisate (A) had a specific gravity of 1.140 and vulcanisate (B) a specific gravity of 0.864.

*Example 2*

(A) To 100 grams of the rubber mix described in Example 1 were added 3 grams of ammonium bicarbonate.

(B) To 100 grams of the same rubber mix was added a mixture of 3 grams of ammonium bicarbonate and 3.3 grams of a paste of 77 percent strength of oleyl-benzyl-dimethyl-ammonium chloride.

Test portions of each composition were heated under exactly the same conditions in a vulcanising press in closed moulds for 20 minutes at 141° C. The specific gravity of vulcanisate (A) was 0.638 and that of vulcanisate (B) was 0.456.

*Example 3*

(A) 100 grams of the rubber mix described in Example 1 were mixed with 3.0 grams of benzene sulphonic acid hydrazide.

(B) 100 grams of the same rubber mix were mixed with 5.0 grams of a mixture prepared as follows:

3 grams of benzene sulphonic acid hydrazide were intimately triturated in a roller mill with 2 grams of a paste of 50 percent strength of the sodium salt of the sulphate of a mixture of fatty alcohols containing 10–16 carbon atoms.

Compositions (A) and (B) were each heated under exactly the same conditions in a vulcanising press in closed moulds for 20 minutes at 141° C. The specific gravity of vulcanisate (A) was 0.505 and that of vulcanisate (B) was 0.452.

*Example 4*

A rubber mix was prepared having the composition:

| | |
|---|---|
| Pale crepe rubber Ia | 70 |
| Copolymer of butadiene and styrene | 30 |
| Zinc compound of pentachlorothiophenol | 0.3 |
| Zinc salt of rape seed oil fatty acid | 3.0 |

The mixture was premasticated for 10 minutes at 110° C. on rollers, and then there were added at 50°–60° C.

| | |
|---|---|
| Calcium silicate | 50 |
| Kaolin | 30 |
| Zinc oxide | 7 |
| White petroleum jelly | 5 |
| Stearic acid | 3 |
| Sulphur | 2.5 |
| Dibenzthiazyl disulphide | 0.4 |
| Cyclo-benzthiazyl-sulphonamide | 0.7 |
| Total | 201.9 |

The above mixture was divided into two parts:

(A) To 100 parts of the rubber mix 8 grams of sodium bicarbonate were added.

(B) To 100 grams of the rubber mix were added 13 grams of a preparation obtained by mixing 80 parts by weight of sodium bicarbonate with 50 parts by weight of a commercial preparation of sodium dodecyl-benzene sulphonate of 60 percent strength. Thus, mixture (B) also contained 8 grams of sodium bicarbonate.

Test bodies made from mixtures (A) and (B) were heated under exactly the same conditions for 15 minutes at 143° C. in a vulcanisation press in a closed mould. The specimens became inflated and vulcanised. The vulcanised test body (A) had a specific gravity of 0.990, and the vulcanised body B had a specific gravity of 0.707.

*Example 5*

The rubber mix described in Example 4 was divided into two portions:

(A) To 100 grams of the rubber mix 8 grams of sodium bicarbonate were added.

(B) To 100 grams of the rubber mix were added 13 grams of the preparation prepared with sodium bicarbonate and sodium dodecyl-benzene sulphonate as described in Example 1, the aforesaid quantity of the preparation containing 8 grams of sodium bicarbonate.

Test bodies made with mixtures (A) and (B) were heated under exactly the same conditions in a vulcanisation press in a closed mould for 15 minutes at 133° C. In this manner the test bodies became inflated and vulcanised. The vulcanisate (A) had a specific gravity of 0.478, and the vulcanisate (B) a specific gravity of 0.603.

We claim:

1. A process for the manufacture of materials having a finely cellular substantially fine pore structure; which comprises first intimately mixing together a surface-active agent and as a blowing agent a compound, selected from the group consisting of ammonium bicarbonate, ammonium carbonate, benzene sulphonic acid hydrazide and urea which evolves on thermal decomposition a gas selected from the group consisting of carbon dioxide, ammonia and sulphur dioxide, thereafter intimately incorporating the resulting mixture in an uncured copolymer of butadiene and styrene, and subsequently curing the mixture with the aid of heat to produce a material having a substantially closed pore structure.

2. A process for the manufacture of materials having a finely cellular substantially fine pore structure; which comprises intimately mixing together a surface-active agent and as a blowing agent a compound, selected from the group consisting of sodium bicarbonate, ammonium bicarbonate, ammonium carbonate and benzene sulphonic acid hydrazide, which evolves on thermal decomposition a gas selected from the group consisting of carbon dioxide, ammonia and sulphur dioxide, thereafter intimately incorporating the resulting mixture in an uncured copolymer of butadiene and styrene and subsequently curing the mixture with the aid of heat to produce a material having a substantially closed pore structure.

3. A process as claimed in claim 2 wherein the blowing agent is prepared in the presence of the surface-active substance.

4. A process as claimed in claim 2, wherein the surface-active substance is a reaction product of ethylene oxide with a fatty alcohol.

References Cited in the file of this patent

UNITED STATES PATENTS 2,466,826    Romaire    Apr. 12, 1949